United States Patent
Kaneko et al.

(10) Patent No.: US 7,560,886 B2
(45) Date of Patent: Jul. 14, 2009

(54) MOTOR CONTROLLING DEVICE FOR MOUNTING ON VEHICLE

(75) Inventors: Satoru Kaneko, Naka (JP); Hideki Miyazaki, Hitachi (JP); Toshiyuki Innami, Mito (JP)

(73) Assignee: Hitachi, Ltd., Tokyo (JP)

( * ) Notice: Subject to any disclaimer, the term of this patent is extended or adjusted under 35 U.S.C. 154(b) by 161 days.

(21) Appl. No.: 11/628,242

(22) PCT Filed: Jul. 7, 2004

(86) PCT No.: PCT/JP2004/009983

§ 371 (c)(1),
(2), (4) Date: Dec. 1, 2006

(87) PCT Pub. No.: WO2006/006235

PCT Pub. Date: Jan. 19, 2006

(65) Prior Publication Data

US 2007/0248338 A1    Oct. 25, 2007

(51) Int. Cl.
    *H02P 7/00*    (2006.01)
(52) U.S. Cl. .................... 318/432; 318/563; 318/433; 318/434
(58) Field of Classification Search .......... 318/432, 318/563, 433, 434, 602, 605, 661, 600; 388/823, 388/903, 907.5
See application file for complete search history.

(56) References Cited

U.S. PATENT DOCUMENTS

| | | | |
|---|---|---|---|
| 5,670,861 A * | 9/1997 | Nor | 320/118 |
| 5,990,657 A | 11/1999 | Masaki et al. | |
| 6,194,856 B1 | 2/2001 | Kobayashi et al. | |
| 6,288,515 B1 | 9/2001 | Hiti et al. | |
| 6,407,531 B1 | 6/2002 | Walters et al. | |
| 6,427,104 B1 | 7/2002 | Matsushita et al. | |
| 2002/0145837 A1 | 10/2002 | Krefta et al. | |

(Continued)

FOREIGN PATENT DOCUMENTS

JP    61-100816 A    5/1986

(Continued)

OTHER PUBLICATIONS

English translation of Forms PCT/IB/338, PCT/IB/373 and PCT/ISA/237 (6 pages).

(Continued)

*Primary Examiner*—Karen Masih
(74) *Attorney, Agent, or Firm*—Crowell & Moring LLP

(57) ABSTRACT

A motor controlling device for mounting on a vehicle, which includes a controller capable of controlling a DC brushless motor at high response and high accuracy. The motor controlling device for mounting on the vehicle to drive the DC brushless motor comprises a main control section (120) for calculating a torque command for the motor, and a current control calculation section (140) constituted by a module or a dedicated LSI independent of the main control section (120). The current control calculation section (140) converts the coordinates of a current of the DC brushless motor into a d-axis direction, i.e., a direction of magnetic flux of a motor rotor, and into a q-axis direction orthogonal to the d-axis direction, and feedback-controls a current in the d-axis direction and a current in the q-axis direction separately.

12 Claims, 9 Drawing Sheets

U.S. PATENT DOCUMENTS

| | | |
|---|---|---|
| 2003/0128009 A1 | 7/2003 | Sakurai et al. |
| 2003/0178245 A1 | 9/2003 | Takagi |
| 2003/0222615 A1 | 12/2003 | Aono et al. |

FOREIGN PATENT DOCUMENTS

| | | |
|---|---|---|
| JP | 61-221596 A | 10/1986 |
| JP | 4-30390 A | 2/1992 |
| JP | 04-340390 A | 11/1992 |
| JP | 5-207776 A | 8/1993 |
| JP | 5-328776 A | 12/1993 |
| JP | 8-272765 A | 10/1996 |
| JP | 9-28099 A | 1/1997 |
| JP | 09-233845 A | 9/1997 |
| JP | 9-252595 A | 9/1997 |
| JP | 2000-217367 A | 8/2000 |
| JP | 2000-312500 A | 11/2000 |
| JP | 2001-231280 A | 8/2001 |
| JP | 2001-315657 A | 11/2001 |
| JP | 2002-58293 A | 2/2002 |
| JP | 2003-2215 A | 1/2003 |
| JP | 2003-199389 A | 7/2003 |
| JP | 2003-219699 A | 7/2003 |
| JP | 2004-72856 A | 3/2004 |
| JP | 2004-96977 A | 3/2004 |
| JP | 2004-129360 A | 4/2004 |
| JP | 2005-168282 A | 6/2005 |

OTHER PUBLICATIONS

European search report dated Dec. 4, 2008.
International Search Report dated Nov. 9, 2004 including an English translation of the pertinent portions (Five (5) pages).

* cited by examiner

EXAMPLE OF TORQUE (CURRENT)

MOTOR CONTROLLING DEVICE FOR MOUNTING ON VEHICLE

TECHNICAL FIELD

The present invention relates to a motor controlling device for mounting on a vehicle, and more particularly to a motor controlling device for mounting on a vehicle, which is suitably used to control a DC brushless motor.

BACKGROUND ART

Recently, needs for motor controlling devices, which are mounted on vehicles and used in EPS systems (Electric Power Steering systems), electric braking systems, etc., have rapidly been increased with a shift to electric operations of actuators mounted on automobiles. Because an electric actuators is substituted for the conventional hydraulic actuator, a very fast control response is demanded and a DC brushless motor (DCBL motor) is used in the motor controlling device for mounting on the vehicle. In order to satisfy the demand for such a fast control response, JP,A 2001-315657, for example, discloses one known technique of constituting a disturbance voltage observer to realize high-response torque control. Also, JP,A 4-340390, for example, discloses another known technique of constituting a current control calculation section for 120°-energization with separate hardware.

DISCLOSURE OF THE INVENTION

However, when the disturbance observer is constituted to realize high-response torque (current) control as disclosed in JP,A 2001-315657, the control response cannot be sped up beyond the calculation cycle of a control unit constituted by a microcomputer, etc. Further, because the control unit is required to execute various kinds of calculations required for not only the current control, but also system control, communication, protection, etc., the calculation cycle cannot be set so short.

In order to realize a faster response capability, it is conceivable to provide a separate calculation unit to execute calculation for the torque (current) control independently of the calculations required for other system control, communication, protection, etc., thereby realizing a shorter calculation cycle. From that point of view, JP,A 4-340390 discloses the technique of constituting the current control calculation section with separate hardware. However, the current control calculation section disclosed in JP,A 4-340390 is adapted for 120°-energization, and it cannot control a motor at high response and high accuracy through vector control.

An object of the present invention is to provide a motor controlling device for mounting on a vehicle, which includes a controller capable of controlling a DC brushless motor at high response and high accuracy.

(1) To achieve the above object, the present invention provides a motor controlling device for mounting on a vehicle to drive a DC brushless motor, wherein the motor controlling device comprises a main control section for calculating a torque command for the motor; and a current control calculation section constituted by a module or a dedicated LSI independent of the main control section, the current control calculation section converting the coordinates of a current of the DC brushless motor into a d-axis direction defined as a direction of magnetic flux of a motor rotor and into a q-axis direction orthogonal to the d-axis direction, and feedback-controlling a current in the d-axis direction and a current in the q-axis direction separately.

With those features, the DC brushless motor can be controlled at high response and high accuracy.

(2) In above (1), preferably, the module or the dedicated LSI including the current control calculation section has a control register therein, and current control constants or motor constants are set in the control register.

(3) In above (1), preferably, the module or the dedicated LSI including the current control calculation section has an AD converter therein, and a motor current and a battery voltage are detected through the AD converter.

(4) In above (1), preferably, the module or the dedicated LSI including the current control calculation section has a coordinate conversion calculation section required for vector control, which is constituted therein as a calculation module in hardware form.

(5) In above (1), preferably, the module or the dedicated LSI including the current control calculation section has a function of monitoring abnormality in mutual relation to the main control section.

(6) In above (1), preferably, the module or the dedicated LSI including the current control calculation section changes an amount of current supplied to the motor, an output voltage of the motor controlling device, or control parameters for the current control in accordance with a signal from a battery controller mounted on the vehicle.

(7) In above (1), preferably, the module or the dedicated LSI including the current control calculation section is provided in plural, and a plurality of motors are driven by one main control section.

BEST MODE FOR CARRYING OUT THE INVENTION

The configuration of a motor controlling device for mounting on a vehicle according to a first embodiment of the present invention will be described below with reference to FIGS. 1-6.

First, the general configuration of a control system for a DCBL motor will be described with reference to FIGS. 1 and 2.

Figure 1:
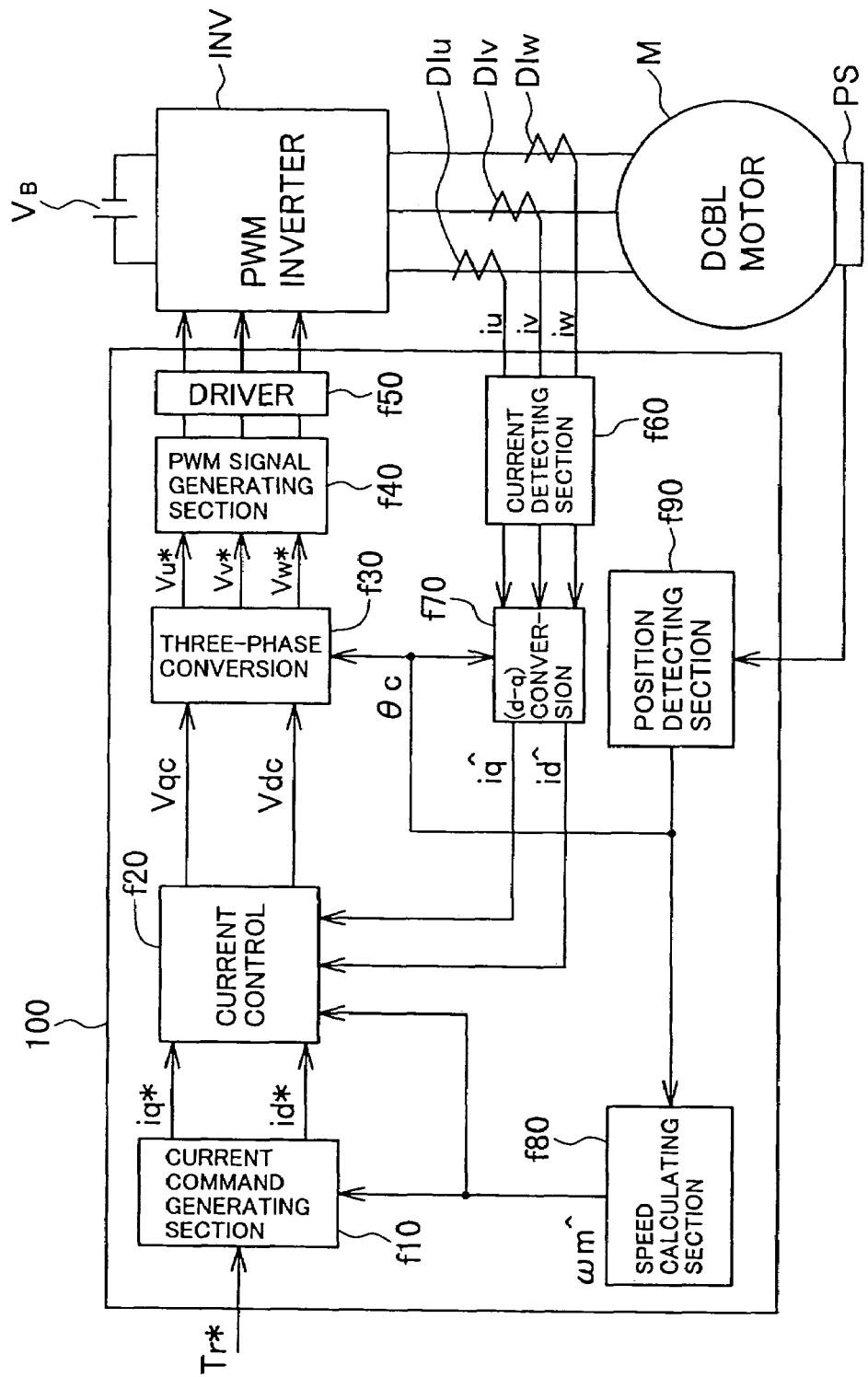
FIG. 1 is a block diagram showing the general configuration of a control system for a DCBL motor.

FIG. 1 is a block diagram showing the general configuration of a control system for a DCBL motor. FIG. 2 is a graph for explaining a (d-q) coordinate system used in control of the DCBL motor.

Recently, needs for motor controlling devices mounted on vehicles have rapidly been increased with a shift to electric operations of vehicle-mounted actuators which are represented by electric power steering systems and electric braking systems. Further, recently, a motor load has been increased with an increase in size of vehicle model to which is applied the motor controlling device, and a DCBL (DC brushless) motor having a smaller size and higher efficiency has been used instead of a DC (Direct Current) motor primarily used in the past.

In the control system for the DCBL motor, a controller 100 receives a torque command Tr* calculated by a higher-level controller through system control, and outputs a PWM signal to a PWM inverter INV so that a DCBL motor M generates torque as intended by the command.

The controller 100 comprises a current command generating section f10, a current control section f20, a three-phase conversion section f30, a PWM signal generating section f40, a gate driver f50, a current detecting section f60, a (d-q) conversion section f70, a speed calculating section f80, and a position detecting section f90.

The current command generating section f10 receives the torque command Tr* and a motor speed $\omega m\hat{}$, and it decides and outputs current commands iq*, id* for providing maximum efficiency at the present operating point. Herein, id* represents a current command in a direction (d-axis) of magnetic flux of a motor rotor, and iq* represents a current command in a direction (q-axis) orthogonal to the direction of magnetic flux of the motor rotor.

Figure 2:
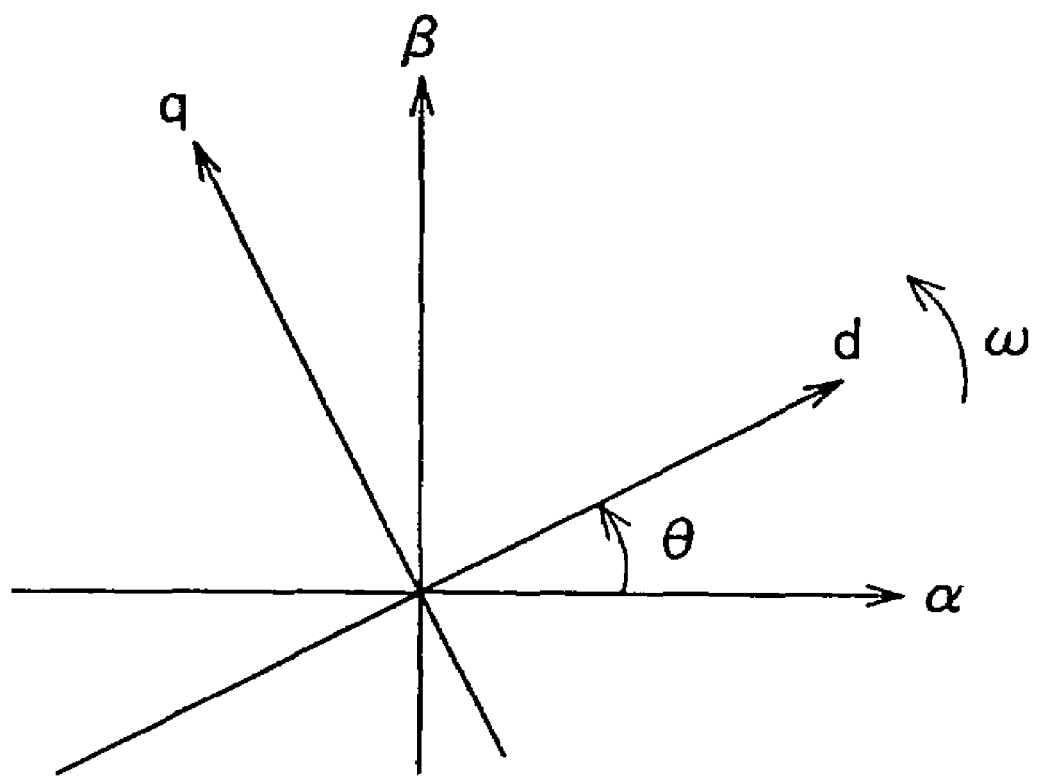
FIG. 2 is a graph for explaining a (d-q) coordinate system used in control of the DCBL motor.

As shown in FIG. 2, the (d-q) coordinates are given on a rotating coordinate system that is rotated at a motor angular speed $\omega$ with respect to ($\alpha$-$\beta$) axes of a stationary coordinate system (i.e., coordinates resulting from two-phase conversion of (U-V-W) phases). In this case, a phase from the a-axis (0°-direction), which is a reference, to the direction (d-axis) of magnetic flux of the motor is defined as a pole position (direction of magnetic flux) $\theta$.

The current control section f20 performs current control calculation on the (d-q) axes of the rotating coordinate system and decides voltage commands Vdc, Vqc on the (d-q) axes. By thus performing the current control with the (d-q) coordinates, the current in the direction of magnetic flux and the current in the direction orthogonal thereto (i.e., in the direction acting on torque) can be each controlled at high accuracy. As a result, the torque and the magnetic flux of the motor can be controlled at high accuracy.

The three-phase conversion section f30 performs coordinate conversion from the (d-q) axes into the (U-V-W) phases and outputs three-phase AC voltage commands Vu*, Vv* and Vw*. The PWM signal generating section f40 converts the AC voltage commands Vu*, Vv* and Vw* into respective PWM signals and outputs the PWM signals to the inverter INV through the gate driver f50.

Feedback values $Id\hat{}$, $Iq\hat{}$ for use in the current control are detected as follows. First, the current detecting section f60 constituted by AD converters, etc. takes in motor currents iu, iv and iw detected by three-phase current sensors DIu, DIv and DIw. Then, the (d-q) conversion section f70 calculates detected currents $id\hat{}$, $iq\hat{}$ on the (d-q) axes and feeds back the calculated currents to the current control section f20.

In that control system, as described above, the pole position $\theta$ is required in the coordinate conversion calculation to obtain the (U-V-W) phase voltage commands from the (d-q) coordinate voltage commands, or the (d-q) coordinate currents from the (U-V-W) phase currents. To that end, a position sensor PS is disposed on the motor M to obtain a rotor-pole position detected value $\theta c$ of the DCBL motor M in cooperation with the position detecting section f90 in the controller 100. Further, the motor angular speed $\omega m\hat{}$ required in the current command generating section f10 and the current control section f20 is determined in the speed calculating section f80 as a time-dependent change amount of the rotor-pole position detected value $\theta c$. (The motor speed may be calculated in the speed calculating section f80 by a method of counting rotation pulses from the position sensor PS by a counter in the controller and calculating the motor speed from the counted value.)

It is to be noted that the above-described control system is a general control system for the DCBL motor and the application range of the present invention is not limited to such a control system.

An example of the configuration of the current control section f20 used in the control system for the DCBL motor will be described below with reference to FIG. 3.

Figure 3:
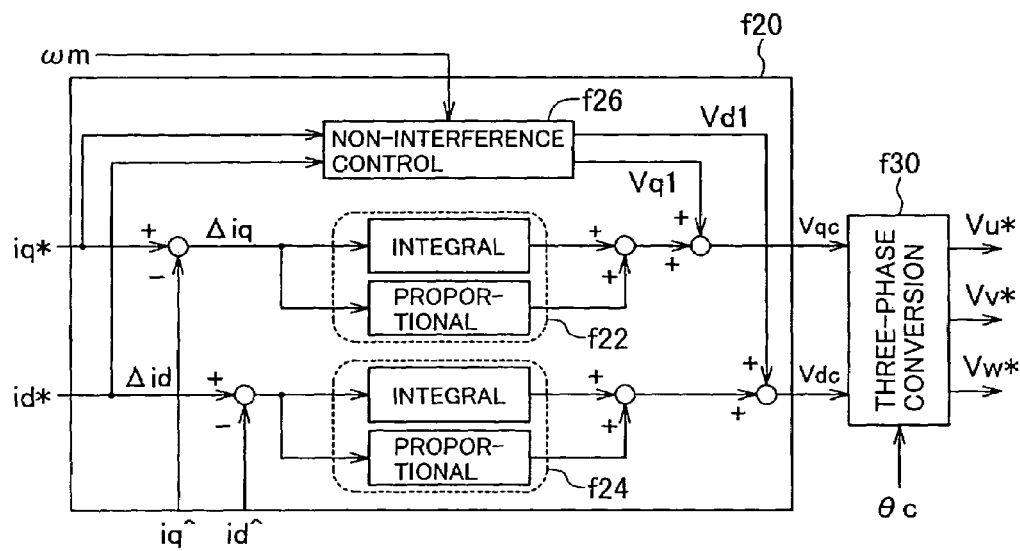
FIG. 3 is a block diagram showing the configuration of a current control section used in the control system for the DCBL motor.

FIG. 3 is a block diagram showing the configuration of the current control section used in the control system for the DCBL motor.

The current control section f20 is constituted to perform current feedback control with the (d-q) coordinates. The current detected values $id\hat{}$, $iq\hat{}$ are fed back to the current command values id*, iq* on the d-axis and the q-axis, respectively. Then, proportional and integral calculation sections f22, f24 perform compensation calculations on respective deviation amounts, and a non-interference control section f26 calculates and compensates respective interference components (compensation amounts Vd1, Vq1) caused by induced voltages on the d-axis and the q-axis, thereby calculating a d-axis voltage command value Vdc and a q-axis voltage command value Vqc. The d-axis voltage command value Vdc and the q-axis voltage command value Vqc are subjected to three-phase conversion calculation in the three-phase conversion section f30 and converted into the three-phase AC voltage commands Vu*, Vv* and Vw* which are outputted as voltage commands for the U-, V- and W-phases.

In the motor control section described above, the processing is usually executed in a digital manner by using a microcomputer (microprocessor). The microcomputer executes various kinds of processing required for not only the motor control section, but also for higher-level system control, communication, abnormality monitoring, protection, and other functions. Therefore, a processing load of CPU is increased and the processing is executed at a calculation cycle of about 100 μsec even in the case of a fast calculation cycle.

Response in the motor controlling device for mounting on the vehicle will be described with reference to FIG. 4.

Figure 4:
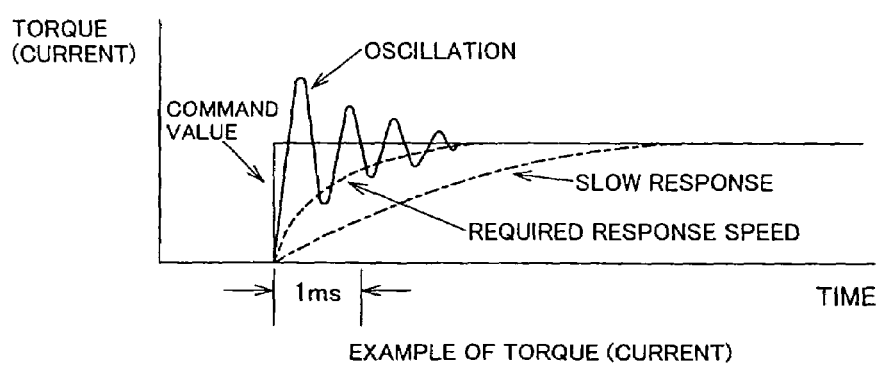
FIG. 4 is a graph for explaining response in a motor controlling device for mounting on a vehicle.

FIG. 4 is a graph for explaining response in the motor controlling device for mounting on the vehicle.

In the motor controlling device for mounting on the vehicle which is used in the EPS, etc., a very fast control response is demanded because an electric actuator is substituted for the conventional hydraulic actuator. One example of the control response is shown in FIG. 4. In some case, a required response time-constant of the detected current value with respect to the current command value is, e.g., about 1 ms. Further, the DCBL motor employed for mounting on the vehicle has a small size with a large capacity, and the winding resistance is very small on the order of several mΩ. It is therefore assumed that the resistance component varies considerably depending on the length of a motor cable and the control response tends to easily vary. In this connection, if the motor cable is shortened and the resistance component is reduced to a very small value, a setting gain of the current control system may eventually appear as a very high gain with respect to the actual resistance component, and the current response may be so sped up that stability of the current control system is affected by the calculation cycle of the motor controlling device. In that case, the response is produced in a pattern of oscillation system as shown in FIG. 4. Conversely, if the response is lowered to avoid such a phenomenon, the system may fail to develop the required performance.

The configuration of the motor controlling device for mounting on the vehicle according to the first embodiment will be described below with reference to FIGS. 5 and 6.

Figure 5:
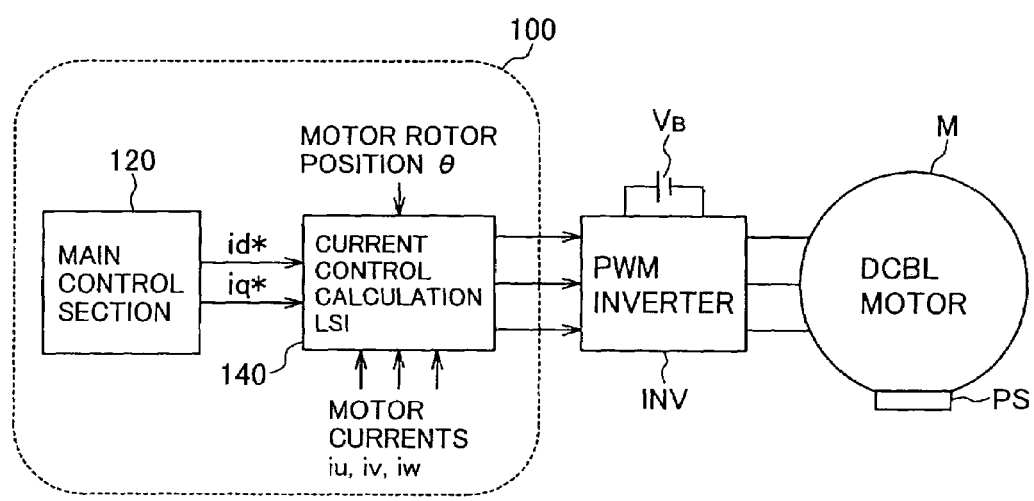
FIG. 5 is a system block diagram showing the configuration of a motor controlling device for mounting on a vehicle according to a first embodiment of the present invention.

FIG. 5 is a system block diagram showing the configuration of the motor controlling device for mounting on the vehicle according to the first embodiment of the present invention. FIG. 6 is a block diagram of a current control-dedicated LSI used in the motor controlling device for mounting on the vehicle according to the first embodiment of the present invention. Note that the same characters as those in FIG. 1 denote the same components.

An effective solution for avoiding the above-described problem of response is to perform the control calculation at a control cycle sufficiently shorter than the required current response. In the present situation, however, the control cycle cannot be so shortened because the controller in the motor controlling device for mounting on the vehicle is used to perform not only the current control calculation for the motor, but also various kinds of calculations required for system control, communication, protection, etc.

Taking into account the above situation, in this first embodiment, the controller 100 is divided into a main control section 120 for executing processing other than the current control, and an a current control calculation LSI 140 for executing only processing for the current control so that the calculation cycle for the motor current control can be held sufficiently shorter than the required control response speed. With such a divided arrangement, a calculation section for executing the current control processing (i.e., the current control calculation LSI 140) can greatly reduce a load imposed on its CPU and can execute the processing at the calculation cycle about several to several tens times faster than that in the past. In practice, a current control calculation module is separately arranged in the microcomputer, or an LSI dedicated to the current control is arranged in the controller.

In the example shown in FIG. 5, the current control calculation LSI 140 is arranged as the calculation section within the controller 100. The current control calculation LSI 140 has the functions of the current control section f20, the three-phase conversion section f30, the PWM signal generating section f40, the gate driver f50, the current detecting section f60, the (d-q) conversion section f70, the speed calculating section f80, and the position detecting section f90 among the components shown in FIG. 1. The main control section 120 has the function of the current command generating section f10 among the components shown in FIG. 1 and various kinds of functions required for the higher-level system control, communication, abnormality monitoring, protection, and others. The main control section 120 is operated at the calculation cycle of, e.g., 2 ms or 5 ms, while the calculation section 140 is operated at the calculation cycle of 100 μs to several tens μs. Because the main control section 120 is no longer required to execute the high-speed current control processing which has been executed so far therein, it can be constituted by using an ordinary inexpensive universal microcomputer. Incidentally, the function of the speed calculating section f80 may be included in the main control section 120.

With the configuration described above, the current control calculation cycle can be made about several to several tens times faster than that in the past, and a stable current control system can be realized. While FIG. 5 shows the case where the current control calculation section is constituted by the dedicated LSI, the current control calculation section may be constituted in the form of a module and arranged as one of peripheral modules within a universal microcomputer for executing the main control calculation.

The configuration of the LSI dedicated to the current control will be described below with reference to FIG. 6.

The current control-dedicated LSI 140 receives current commands from a higher-level controller (i.e., the main control section 120 in FIG. 5) via communication and stores the current commands in a RAM 142. Also, various parameters required for the current control, such as the battery voltage requirement, the control response time, and the constants of the motor to be driven, can be set in a control register 144. Actual control logic is written in a ROM 146, and a processor 148 executes processing operations in accordance with the written control logic.

Among the feedback signals required for the current control, the motor rotor position is obtained by detecting the signal from the position sensor by a timer counter 150. The position detecting section is constituted in different ways depending on the type of the position sensor used. For example, when the position sensor is a resolver, the position detecting section can be constituted by a data bus or by a counter for receiving rotating pulses (in A- and B-phase).

The motor current is detected by a dedicated high-speed A/D converter 152. The high-speed A/D converter 152 includes sample holders in number equal to the number of the detected currents so that sampling of two- or three-phase currents can be performed at the same time. The high-speed A/D converter 152 can also detect a battery voltage value required for the output adjustment in the current control.

To perform control on the (d-q) coordinates, the dedicated LSI 140 further includes a three-phase conversion section 154 and a (d-q) conversion section 156. The three-phase conversion section 154 and the (d-q) conversion section 156 execute routine calculations, and are designed by using algorithms which will not be changed after once installed. Therefore, the three-phase conversion section 154 and the (d-q) conversion section 156 are constituted in the form of hardware using analog devices, e.g., an operational amplifier. With such a configuration, the current control calculation can be performed at a higher speed.

Voltage commands calculated through the above-described configuration are subjected to pulse width modulation in a PWM timer 158 for conversion into PWM signals, which are outputted to the PWM inverter through a gate driver 160. By incorporating the gate driver 160 in the dedicated LSI 140, the number of parts can be further reduced.

While the current control calculation section is constituted by the dedicated LSI in the above description, it may be constituted by one of peripheral modules of the microcomputer, as mentioned above. Also, while this first embodiment uses a current control method based on current feedback using the (d-q) coordinates, current feedback control using a three-phase AC current can also be used.

Thus, according to this first embodiment, the current control-dedicated LSI is provided as the control section for the current control and is given with the current feedback control function for the DC brushless motor. Further, the current control calculation section for 180°-energization is given with the functions which are executed by the (d-q) conversion section for converting the coordinates of the current of the DC brushless motor into the d-axis direction, i.e., the direction of magnetic flux of the motor rotor, and into the q-axis direction orthogonal to the d-axis direction, and by the three-phase conversion section for converting the d-axis voltage command value Vdc and the q-axis voltage command value Vqc into the three-phase AC voltage commands in U-, V- and W-phases, thereby executing feedback control of the current in the d-axis direction and the current in the q-axis direction separately. As a result, the DC brushless motor can be controlled at high response and high accuracy.

The configuration of a motor controlling device for mounting on a vehicle according to a second embodiment of the present invention will be described below with reference to FIG. 7.

Figure 6:
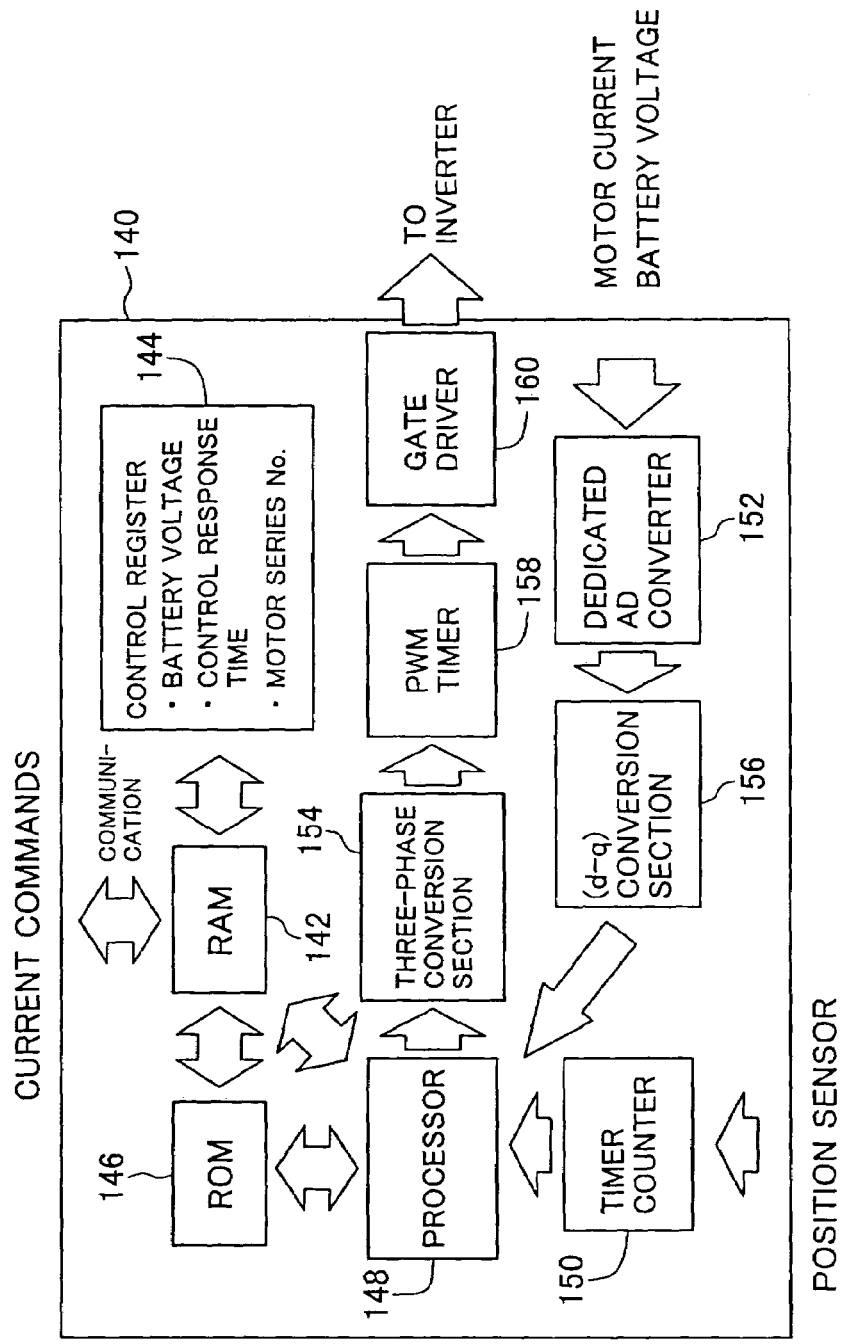
FIG. 6 is a block diagram of a current control-dedicated LSI used in the motor controlling device for mounting on the vehicle according to the first embodiment of the present invention.
Figure 7:
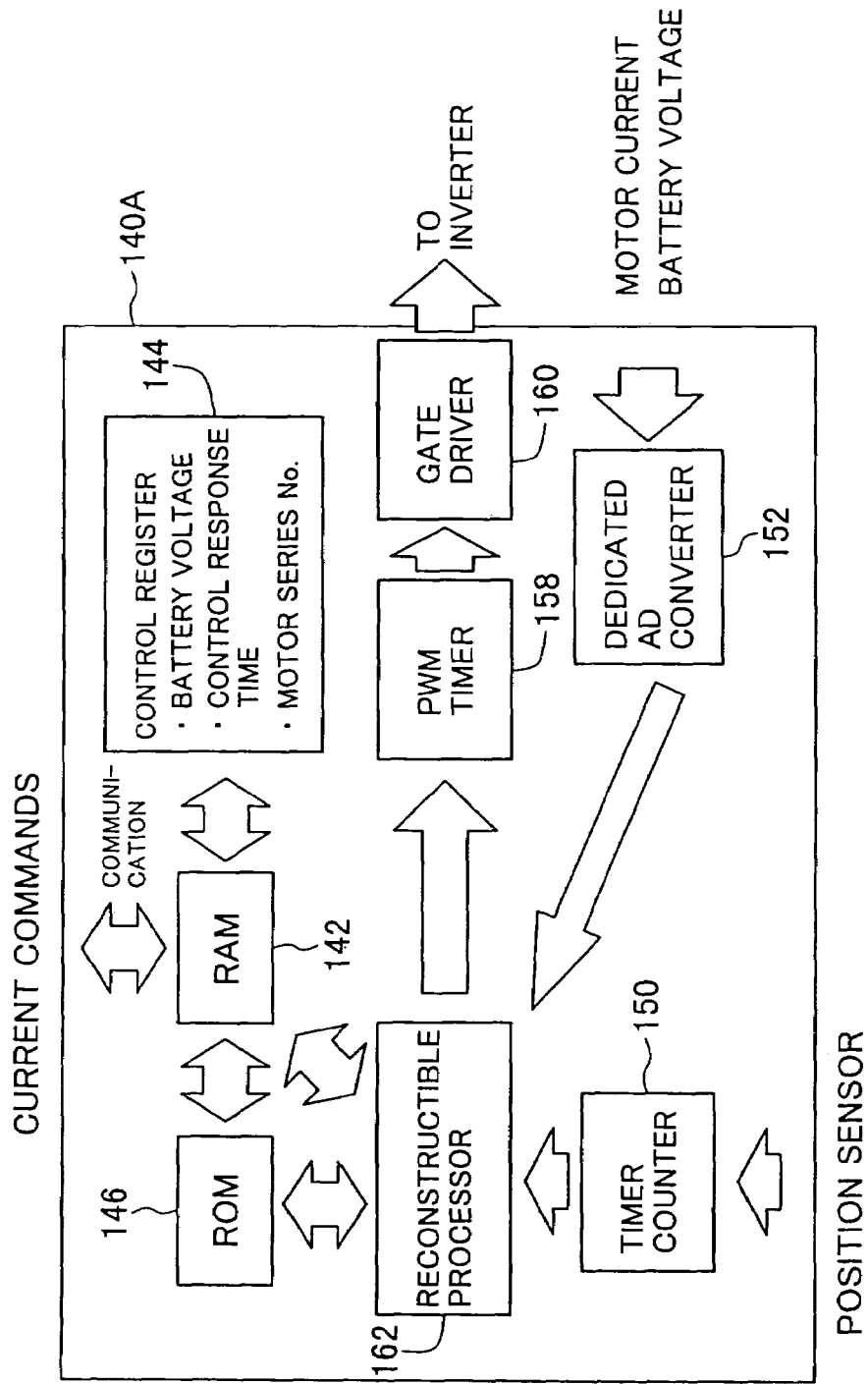
FIG. 7 is a block diagram of a current control-dedicated LSI used in a motor controlling device for mounting on a vehicle according to a second embodiment of the present invention.

FIG. 7 is a block diagram of a current control-dedicated LSI used in the motor controlling device for mounting on the vehicle according to the second embodiment of the present invention. Note that the same characters as those in FIG. 6 denote the same components.

In a current control-dedicated LSI 140A according to the second embodiment of the present invention, the calculation section is constituted by a reconstructible processor 162 instead of the processor 148, the three-phase conversion section 154, and the (d-q) conversion section 156 shown in FIG. 6. The reconstructible processor 162 is a unit which includes an analog device group made up of a plurality of basic analog circuits and in which wiring can be changed by programming as required. The configuration for the current control can be freely changed by using such a unit.

According to this second embodiment, it is possible not only to control the DC brushless motor at high response and high accuracy, but also to freely change the configuration for the current control.

The configuration of a motor controlling device for mounting on a vehicle according to a third embodiment of the present invention will be described below with reference to FIG. 8.

Figure 8:
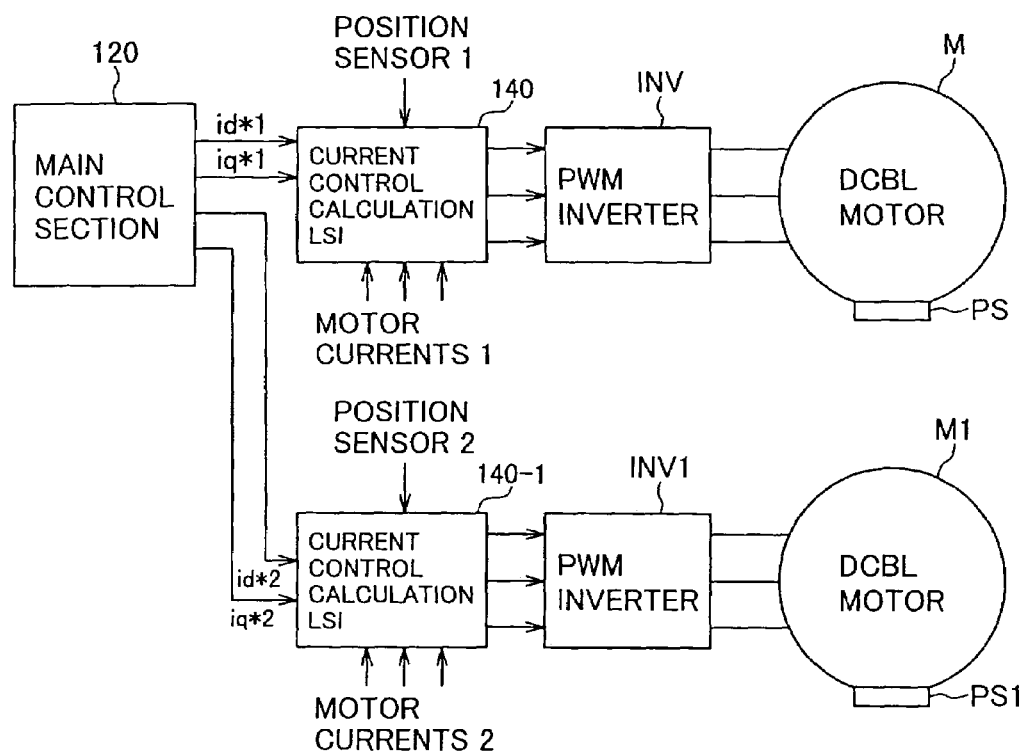
FIG. 8 is a block diagram showing the configuration of a motor controlling device for mounting on a vehicle according to a third embodiment of the present invention.

FIG. 8 is a block diagram showing the configuration of the motor controlling device for mounting on the vehicle according to the third embodiment of the present invention. Note that the same characters as those in FIG. 5 denote the same components.

In this third embodiment, a plurality of current control-dedicated LSIs 140, 140-1 are provided for the main control section 120. Each of the current control-dedicated LSIs 140, 140-1 is constituted as shown in FIG. 6 or 7. The current control-dedicated LSIs 140, 140-1 control PWM inverters INV, INV1, thereby driving and controlling DCBL motors M, M1, respectively.

In the past, it has been very difficult to control two motors by one microcomputer at high response for the reason that the calculation time is not sufficiently fast. By employing the configuration of this third embodiment, however, the plurality of motors M, M1 and the inverters INV, INV1 can be driven by one main control section 120. Because the plurality of current control-dedicated LSIs 140, 140-1 can be operated at the same time, the plurality of motors can be controlled at high response even by only one main control section 120.

In the electric braking system as one application of the motor controlling device for mounting on the vehicle, a plurality of motors are required to be controlled at high response at the same time independently of each other. Therefore, this third embodiment is suitable for such a system.

According to this third embodiment, it is possible to not only control the DC brushless motor at high response and high accuracy, but also to control a plurality of motors at the same time independently of each other.

The configuration of a motor controlling device for mounting on a vehicle according to a fourth embodiment of the present invention will be described below with reference to FIG. 9.

Figure 9:
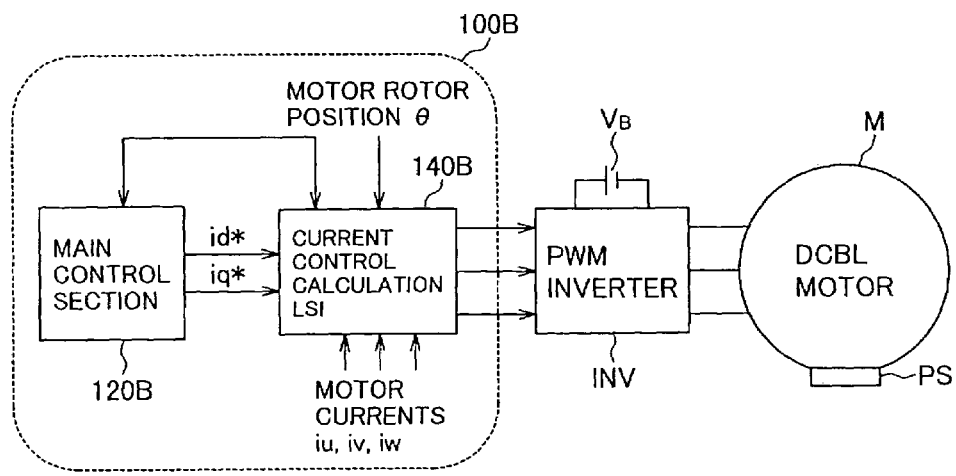
FIG. 9 is a block diagram showing the configuration of a motor controlling device for mounting on a vehicle according to a fourth embodiment of the present invention.

FIG. 9 is a block diagram showing the configuration of the motor controlling device for mounting on the vehicle according to the fourth embodiment of the present invention. Note that the same characters as those in FIG. 5 denote the same components.

In this fourth embodiment, a current control-dedicated LSI 140B is given with, in addition to the functions of the current control-dedicated LSIs 140 and 140A shown in FIGS. 6 and 7, the monitoring function to perform mutual monitoring between a main control section 120B, which is constituted by, e.g., a universal microcomputer, and the current control-dedicated LSI 140B.

Usually, an onboard controller includes the so-called "monitoring microcomputer" for monitoring an abnormality in a main microcomputer for control at all times. In that case, a separate LSI has to be prepared as the monitoring microcomputer, and the cost is increased correspondingly.

In contrast, with the configuration described above, the necessity of newly adding the "monitoring microcomputer" is eliminated, whereby the number of parts can be reduced and the cost can be cut.

According to this fourth embodiment, it is possible to not only control the DC brushless motor at high response and high accuracy, but also to easily realize the mutual monitoring function.

The configuration of a motor controlling device for mounting on a vehicle according to a fifth embodiment of the present invention will be described below with reference to FIG. 10.

Figure 10:
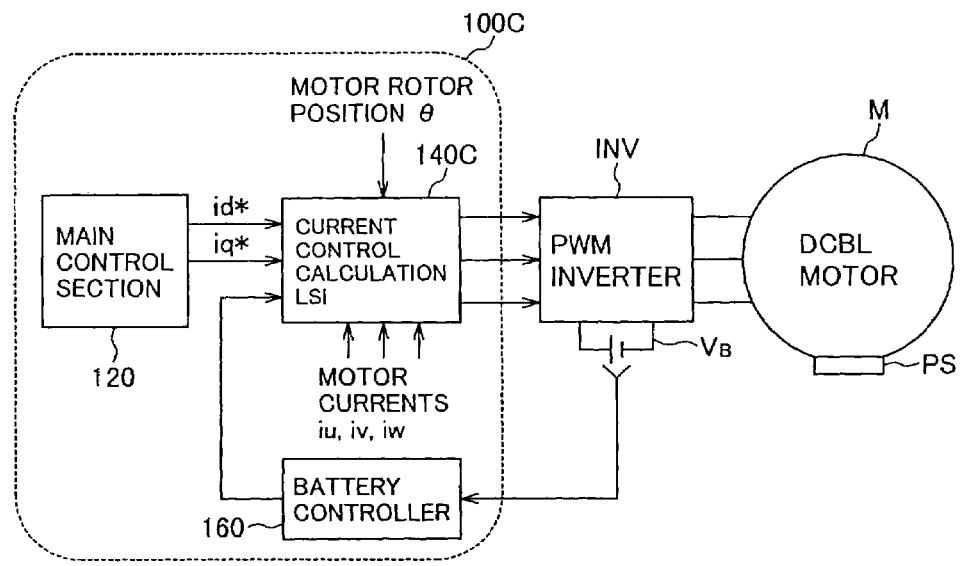
FIG. 10 is a block diagram showing the configuration of a motor controlling device for mounting on a vehicle according to a fifth embodiment of the present invention.

FIG. 10 is a block diagram showing the configuration of the motor controlling device for mounting on the vehicle according to the fifth embodiment of the present invention. Note that the same characters as those in FIG. 5 denote the same components.

In this fifth embodiment, a controller 100C includes a battery controller 160 for monitoring the state of a battery VB and controlling the battery VB to be held in properly charged/discharged condition. The battery controller 160 controls the voltage and the charged/discharged amount of the battery VB, and sends a resulting control operation input to a current control-dedicated LSI 140C. The current control-dedicated LSI 140C adjusts an output for the current control in accordance with the control operation input.

With such a configuration, the battery life can be prolonged by cooperation of the battery controller and the current control LSI without imposing a software load on a universal CPU, and optimum battery control can be realized.

According to this fifth embodiment, it is possible to not only control the DC brushless motor at high response and high accuracy, but also to prolong the battery life.

The configuration of a motor controlling device for mounting on a vehicle according to a sixth embodiment of the present invention will be described below with reference to FIG. 11.

Figure 11:
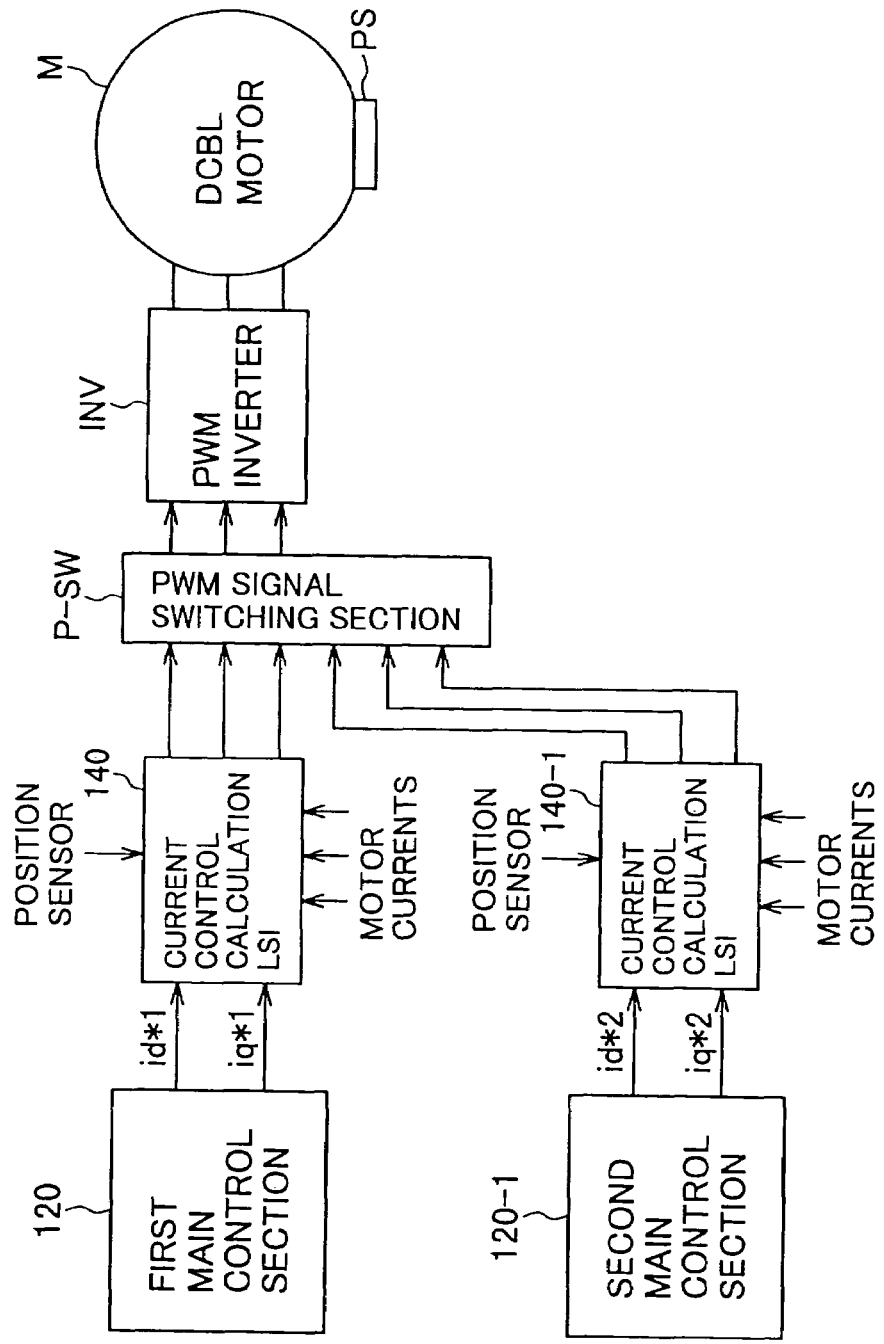
FIG. 11 is a block diagram showing the configuration of a motor controlling device for mounting on a vehicle according to a sixth embodiment of the present invention.

FIG. 11 is a block diagram showing the configuration of the motor controlling device for mounting on the vehicle according to the sixth embodiment of the present invention. Note that the same characters as those in FIG. 5 denote the same components.

In this sixth embodiment, the motor controlling device includes a plurality of main control sections 120, 120-1, a plurality of current control-dedicated LSIs 140, 140-1, and a PWM signal switching section P-SW. The basic configuration and function of each of the main control sections 120, 120-1 and each of the current control-dedicated LSIs 140, 140-1 are the same as those of the main control section 120 and the current control-dedicated LSI 140 shown in FIG. 5.

The first main control section 120 executes system control calculation in accordance with the driver's operation and outputs current command values id*1, iq*1 for the DCBL motor M. The second main control section 120-1 executes system control calculation in accordance with signals from a radar and/or a camera for detecting an object located forward, rearward or laterally of the vehicle, and outputs current command values id*2, iq*2 for the DCBL motor M. The first main control section 120 and the second main control section 120-1 are connected respectively to the current control-dedicated LSIs 140, 140-1 so that they can control the DCBL motor M independently of each other.

The PWM signal switching section P-SW switches over output signals of the current control-dedicated LSIs 140, 140-1 to be selectively outputted to the PWM inverter INV. Usually, the PWM signal switching section P-SW makes determination such that the DCBL motor M is driven by the output of the first main control section 120 which executes the system control calculation in accordance with the driver's operation. On the other hand, only when there is no driver's reaction in spite of an alarm being issued upon the approach of an obstacle, for example, the DCBL motor M is driven by the output of the second main control section 120-1 to perform a collision avoiding operation. If any driver's reaction is detected even while the DCBL motor M is driven by the output of the second main control section 120-1, the PWM signal switching section P-SW performs switching-over to the driving with the first main control section 120. In the case of such an operation, the main control section is required to execute control processing at high speed, and therefore a difficulty arises in processing two or more different signals by one CPU. To be adaptable for that case, two main control sections and two current control-dedicated LSIs are provided in this sixth embodiment.

According to this sixth embodiment, it is possible to not only control the DC brushless motor at high response and high accuracy, but also to realize the operation for avoiding a collision, etc.

As described above, according to the embodiments, since the current control-dedicated LSI is newly provided, control response can be improved without imposing a software load on the microcomputer which executes the main control, and reliability can be ensured without increasing the cost. As a result, the motor controlling device for mounting on the vehicle, having stable and high-response controllability, can be obtained.

INDUSTRIAL APPLICABILITY

According to the present invention, the DC brushless motor can be controlled at high response and high accuracy.

The invention claimed is:

1. A motor controlling device for mounting on a vehicle to drive a DC brushless motor, said motor controlling device comprising:
   a main control section for calculating a torque command for said motor; and
   a current control calculation section constituted by a module or a dedicated LSI independent of said main control section, said current control calculation section converting the coordinates of a current of said DC brushless motor into a d-axis direction defined as a direction of magnetic flux of a motor rotor and into a q-axis direction orthogonal to the d-axis direction, and feedback-controlling a current in the d-axis direction and a current in the q-axis direction separately;
   wherein a first calculation cycle of said current control calculation section is shorter than a second calculation cycle of said main control section.

2. The motor controlling device for mounting on the vehicle according to claim 1,
   wherein said module or said dedicated LSI including said current control calculation section has a control register therein, and
   current control constants or motor constants are set in said control register.

3. The motor controlling device for mounting on the vehicle according to claim 1,
   wherein said module or said dedicated LSI including said current control calculation section has an AD converter therein, and
   a motor current and a battery voltage are detected through said AD converter.

4. The motor controlling device for mounting on the vehicle according to claim 1,
   wherein said module or said dedicated LSI including said current control calculation section has a coordinate conversion calculation section required for vector control, which is constituted therein as a calculation module in hardware form.

5. The motor controlling device for mounting on the vehicle according to claim 1,
   wherein said module or said dedicated LSI including said current control calculation section has a function of monitoring abnormality in mutual relation to said main control section.

6. The motor controlling device for mounting on the vehicle according to claim 1,
   wherein said module or said dedicated LSJ including said current control calculation section changes an amount of current supplied to said motor, an output voltage of said motor controlling device, or control parameters for the current control in accordance with a signal from a battery controller mounted on said vehicle.

7. The motor controlling device for mounting on the vehicle according to claim 1,
   wherein said module or said dedicated LSI including said current control calculation section is provided in plural, and a plurality of motors are driven by one said main control section.

8. The motor controlling device for mounting on the vehicle according to claim 1,
wherein said module or said dedicated LSI including said current control calculation section is provided in plural, and
one motor is driven while selectively switching over said plurality of modules or dedicated LSIs.

9. The motor controlling device for mounting on the vehicle according to claim 1,
wherein said first calculation cycle and said second calculation cycle differs single or more figures.

10. The motor controlling device for mounting on the vehicle according to claim 1,
wherein said first calculation cycle is $\frac{1}{20}$ or less than said second calculation cycle.

11. The motor controlling device for mounting on the vehicle according to claim 1,
wherein said first calculation cycle is 20-100 μs, and said second calculation cycle is 2-5 ms 12. The motor controlling device for mounting on the vehicle according to claim 1, wherein said motor controlling device controls an electric power steering system.

* * * * *